3,116,149
METHOD OF MAKING PASTRY
Ralph E. Luedtke, Colerain Township, Hamilton County, Ohio, assignor to The Procter & Gamble Company, Cincinnati, Ohio, a corporation of Ohio
No Drawing. Filed Oct. 8, 1962, Ser. No. 229,208
4 Claims. (Cl. 99—92)

This invention relates to pastry compositions. More particularly, it relates to a novel method for preparing a pastry dough utilizing substantial amounts of a pourable shortening.

The amount of shortening in pastry normally ranges from about 35% to 80% of the flour content, and it has always been considered desirable to use a plastic shortening, especially at higher shortening levels, so that liquid oil does not separate from the dough, and it is impossible to roll out the dough without employing special handling techniques.

It is highly desirable to use either liquid oil, or pourable shortenings containing only very small amounts of hydrogenated fats, in pastry doughs, so that a substantial amount of polyunsaturated fats is present in the dough. In addition to certain health and nutritional aspects, the use of such shortenings makes the pastry more tender. However, in the past when such pourable shortenings have been used it has been necessary to roll out the dough between sheets of waxed paper or similar materials, and the formed dough has been difficult to handle. In addition, only about 40% of pourable shortening, based on the weight of flour, could be incorporated in the dough to minimize liquid oil separation.

It has now been found that by means of the novel process of this invention a pastry dough can be made containing large amounts of pourable shortening, but with much simpler handling techniques than have heretofore been used for such shortenings.

Accordingly, it is an object of this invention to provide an improved method for preparing a pastry dough containing pourable shortening.

It is a further object to provide a dough which is more tender and has superior eating qualities as compared to pastry doughs made with plastic shortenings.

Other objects and advantageous features will be apparent from the following detailed description.

Pastry doughs of this invention comprise flour, pourable fatty shortening in an amount ranging from about 35% to 85%, by weight, of the total flour in the dough, and water. The doughs may additionally contain salt or other flavoring materials, and milk solids or corn sugar solids, which have a caramelizing effect on the dough and give it a golden brown color.

The method for forming the dough comprises the steps of (1) combining water with from about 25% to about 45% of the total flour material, (2) mixing said combination of water and flour until gluten has substantially developed, (3) adding the remaining dough ingredients, including pourable shortening and flour, and (4) mixing until a pastry dough has formed.

Flours suitable for use in the practice of this invention include any commonly used for pastry doughs. All-purpose flour, or unbleached pastry flour, are very satisfactory, although bread and cake flours can be used. In defining formulas for pastries hereinafter, all proportions of ingredients will be based on amounts relative to 100 parts of flour.

Pourable shortenings which can be used in this invention include oils derived from naturally occurring liquid glyceride oils such as cottonseed oil, soybean oil, peanut oil, rapeseed oil, sesame seed oil, and sunflower seed oil. Also suitable are liquid oil fractions obtained from palm oil, lard, and tallow, as for example, by graining or directed interesterification, followed by separation of the oil. Oils predominating in glycerides of unsaturated acids may require some hydrogenation to maintain flavor, but the hydrogenation should not be carried out to the extent that the oil contains solid fatty material. Also suitable are certain di- or tri-glycerides in which one or two of the hydroxyl groups of the glycerine have been esterified with acetic, propionic, butyric, or caproic acids, and one or two of the remaining hydroxyl groups of the glycerine have been esterified with higher molecular weight fatty acids having from 12 to 22 carbon atoms.

Other pourable shortenings include oils, such as those mentioned above, in which are suspended small amounts of higher melting fatty materials. Examples of suitable suspensions of this type are disclosed in U.S. Patent 2,815,286, issued December 3, 1957, to James R. Andre and Louis H. Going. In general, it is preferred that some solid materials be present in shortenings which are used at high levels in pastry doughs of this invention.

The pourable shortenings suitable for use in this invention can also contain dissolved or suspended therein small amounts of emulsifiers and other agents such, for example, as mono- and diglyceride emulsifiers, lactylated glyceride emulsifiers, sorbitan or polyoxyethylene esters of fatty acids, fatty esters of other polyhydric alcohols, fatty acid derivatives of hydroxy polycarboxylic acids, and many other substances commonly used in shortenings to improve their cooking or other properties.

Antioxidants and preservative materials such as methyl silicone, butylated hydroxytoluene, butylated hydroxyanisole, and citric acid can also be present in the shortenings.

The amount of pourable shortening suitable for use in pastry doughs of this invention can range from about 35% to about 80%, by weight, of the total flour. If less than about 35% of shortening is present, the pastry baked from the dough will have no flakiness and will not be representative of a good "short" pastry. If more than about 80% shortening is present the pastry will be too tender to handle. It is preferred that shortenings to be used at higher levels contain some high-melting fatty materials.

The amount of water which can be used in pastry doughs of this invention can range from about 20% to 40%, by weight, of the total flour. Higher moisture levels are preferred when higher shortening levels are used.

As has been heretofore pointed out, it may be desirable to add materials such as milk solids or corn sugar solids to the pastry dough to promote a golden brown color, and up to about 12%, by weight of flour, may be added to the pastry for this purpose.

Small amounts of salt or other flavoring materials are conventionally added to the pastry doughs.

The first step in practicing the process of this invention is to combine water with from about 25% to about 45% of the total flour, and to mix the water and flour until the gluten in the flour has substantially developed. In general, the gluten will be satisfactorily developed when the mixture begins to form a cohesive mass and pulls away from the sides of the mixing bowl. At least about 3 minutes mixing time is required for development of the gluten. However, longer than about 7 minutes mixing will break the developed gluten. It is preferred that all of the water be added to the dough since if too small an amount of water is added, the gluten will either not develop sufficiently, or too long a time will be required for the mixing.

When the gluten has been substantially developed the pourable shortening is added, together with the remaining flour and other ingredients. Mixing is continued until the pastry dough has formed.

It will be found that although a substantial amount of shortening is present in the mixture, and in pourable form, the dough can be rolled on a board in the same manner as can the pastries made with conventional plastic shortenings. Doughs made by this process also can be refrigerated or frozen without separation of oily material from the dough.

The completed dough can then be baked to form a tender, flaky pastry.

The following examples show specific embodiments of the invention:

*Example I*

A pastry dough was made having the following composition:

| | |
|---|---|
| All-purpose flour | 12 lbs. |
| Water | 3 lbs. 8 ozs. |
| Shortening [1] | 8 lbs. 8 ozs. |
| Non-fat dry milk solids | 12 ozs. |
| Salt | 5 ozs. |

[1] The shortening used in this example was a commercial pourable shortening comprising soybean oil hydrogenated to an iodine value of about 110 and having suspended therein, by weight of total shortening, about 1.4% monoglyceride, 1.4% diglyceride and 4.2% triglyceride made from substantially completely hydrogenated soybean oil.

Four pounds of the flour were mixed with all the water, using an electric mixer, for 5 minutes. The mixture formed a mass resembling roll or bread dough which drew away from the sides of the mixing bowl. The remainder of the flour, and the shortening, salt, and milk solids were added, and mixed for 1 minute at low speed with an electric mixer. The mixture was scraped down from the sides of the bowl and the mixer paddle, and then mixing was continued for an additional minute. A portion of the dough was rolled into a sheet and placed in a floured 9-inch pie tin to form a pie shell. A second pie tin of the same shape was placed on top of the dough, and both tins, with the dough sandwiched between, were inverted and placed in an oven heated to 375° F. The pie shell was baked for 17 minutes and then removed from the oven and inverted. The top tin was removed and the pie shell was replaced in the oven and baked for an additional 12 minutes.

The pie dough was easy to handle and no separation of oil was noticed, even from a portion of the dough which had been placed in a refrigerator for several hours.

The baked pie shell was tender and flaky and a golden brown color.

Corn sugar solids can be substituted for the milk solids in the foregoing examples with comparable results.

*Example II*

Additional pie shells were made having a composition similar to that of Example I, except that the following shortenings were substituted:

A. Soybean oil hydrogenated to an iodine value of about 110, and having suspended therein, by weight of total shortening, about 4.8% propylene glycol monostearate, 1.4% stearic acid, 2% soybean oil hydrogenated to an iodine value of 8, and about 3.2% mono- and diglycerides derived from soybean oil hydrogenated to an iodine value of 8.

B. Soybean oil hydrogenated to an iodine value of about 110, and having suspended therein, by weight of total shortening, about 4%, by weight, of soybean oil hydrogenated to an iodine value of 8.

C. Refined and bleached cottonseed oil.

Excellent pie doughs and baked pie shells resulted from the use of the above shortenings. Comparable results are noted at shortening levels ranging from 35% to 80%, by weight, of the flour content of the pastry.

By way of comparison, a pie dough was made having a composition similar to that of Example I except that all ingredients were placed in a bowl and mixed in one stage. The shortening separated from the dough after it had been standing for a very short time, and the dough was difficult to handle.

What is claimed is:

1. The method of making a pastry dough, comprising flour, water in an amount ranging from about 20% to 40%, and a pourable shortening in an amount ranging from about 35% to 80%, both water and shortening based on the total flour in said dough, said method comprising the steps of:
    (1) combining said water with from about 25% to about 45% of the total flour,
    (2) mixing said combination of water and flour for about 3 to 7 minutes and until gluten has substantially developed,
    (3) adding remaining pastry ingredients, including shortening and flour, and
    (4) mixing until a pastry dough has formed.

2. The method according to claim 1 wherein the dough additionally contains up to 12%, by weight of flour, of dried milk solids.

3. The method according to claim 1 wherein the dough additionally contains up to 12%, by weight of flour, of corn sugar solids.

4. The method according to claim 1 wherein the pastry dough is baked.

References Cited in the file of this patent

UNITED STATES PATENTS

| | | |
|---|---|---|
| 2,726,156 | Armstrong | Dec. 6, 1955 |
| 2,731,350 | Busch | June 17, 1956 |

FOREIGN PATENTS

| | | |
|---|---|---|
| 538,713 | Great Britain | Aug. 14, 1941 |